United States Patent
Fein et al.

(10) Patent No.: US 7,631,051 B1
(45) Date of Patent: Dec. 8, 2009

(54) GEOLOCATION ASSISTED DATA FORWARDING STORAGE

(76) Inventors: Gene Fein, 29712 Zuma Bay Way, Malibu, CA (US) 90265; Edward Merritt, 139 Lime Kiln Rd., Lenox, MA (US) 01240

(*) Notice: Subject to any disclaimer, the term of this patent is extended or adjusted under 35 U.S.C. 154(b) by 0 days.

(21) Appl. No.: 12/240,925

(22) Filed: Sep. 29, 2008

(51) Int. Cl.
*G06F 15/167* (2006.01)

(52) U.S. Cl. .................................... 709/212

(58) Field of Classification Search ................ 709/251, 709/212; 710/100
See application file for complete search history.

(56) References Cited

U.S. PATENT DOCUMENTS

| | | | |
|---|---|---|---|
| 5,787,258 A * | 7/1998 | Costa et al. ................. | 709/251 |
| 6,151,395 A * | 11/2000 | Harkins ..................... | 380/286 |
| 6,684,258 B1 * | 1/2004 | Gavin et al. ................. | 709/251 |
| 7,136,638 B2 | 11/2006 | Wacker et al. .............. | 455/424 |
| 7,143,170 B2 * | 11/2006 | Swildens et al. ........... | 709/226 |
| 7,295,556 B2 | 11/2007 | Roese et al. ............. | 370/395.3 |
| 7,404,002 B1 * | 7/2008 | Pereira ...................... | 709/231 |
| 2002/0194371 A1 * | 12/2002 | Kadoi ........................ | 709/239 |
| 2004/0223503 A1 * | 11/2004 | Lynch et al. ................ | 370/404 |
| 2005/0201409 A1 * | 9/2005 | Griswold et al. ............ | 370/445 |
| 2005/0243823 A1 * | 11/2005 | Griswold et al. ............ | 370/389 |
| 2006/0031593 A1 * | 2/2006 | Sinclair ...................... | 709/251 |
| 2007/0050446 A1 | 3/2007 | Moore ........................ | 709/203 |
| 2007/0195772 A1 * | 8/2007 | Shadish ...................... | 370/390 |
| 2008/0101277 A1 | 5/2008 | Taylor et al. ................ | 370/328 |
| 2008/0144655 A1 | 6/2008 | Beam et al. ................ | 370/466 |
| 2009/0067322 A1 * | 3/2009 | Shand et al. ................ | 370/225 |

FOREIGN PATENT DOCUMENTS

| WO | 2008/006079 | 1/2008 |
|---|---|---|
| WO | 2008/094930 | 8/2008 |

OTHER PUBLICATIONS

Wagner "A Network Application Programming Interface for Data Processing in Sensor Networks".

* cited by examiner

*Primary Examiner*—J Bret Dennison
(74) *Attorney, Agent, or Firm*—Chinh H. Pham; Greenberg Traurig, LLP

(57) ABSTRACT

A method includes, in a network of interconnected computer system nodes, receiving a request from a source system to store data, directing the data to a computer memory in conjunction with its geolocation, geolocation enabling selecting nodes that are proximate to each other or a user to increase speed and efficiency, and continuously forwarding the data from one computer memory to another computer memory in the network of interconnected computer system nodes in conjunction with their geolocations without storing on any physical storage device in the network.

16 Claims, 5 Drawing Sheets

GEOLOCATION ASSISTED DATA FORWARDING STORAGE

CROSS-REFERENCES TO RELATED APPLICATIONS

The present patent application is related to U.S. Ser. No. 12/046,757, filed on Mar. 12, 2008; U.S. Ser. No. 12/052,345, filed on Mar. 20, 2008; U.S. Ser. No. 12/132,804, filed Jun. 4, 2008; U.S. Ser. No. 12/099,498, filed on Apr. 8, 2008; U.S. Ser. No. 12/109,458, filed Apr. 25, 2008; U.S. Ser. No. 12/116,610, filed May 7, 2008; U.S. Ser. No. 12/170,901, filed Jul. 10, 2008; U.S. Ser. No. 12/170,925, filed on Jul. 10, 2008; U.S. Ser. No. 12/184,866, filed on Aug. 1, 2008; U.S. Ser. No. 12/240,951, filed on Sep. 29, 2008; U.S. Ser. No. 12/241,032 filed on Sep. 29, 2008; U.S. Ser. No. 12/241,003 filed on Sep. 29, 2008; U.S. Ser. No. 12/240,991 filed on Sep. 29, 2008; U.S. Ser. No. 12/240,967 filed on Sep. 29, 2008; U.S. Ser. No. 12/240,885 filed on Sep. 29, 2008; and U.S. Ser. No. 12/240,757 filed on Sep. 29, 2008.

BACKGROUND

At least some embodiments disclosed herein relate to data storage, and more particularly, to geolocation assisted data forwarding storage.

The volume of data that must be stored by individuals, organizations, businesses and government is growing every year. In addition to just keeping up with demand, organizations face other storage challenges. With the move to on-line, real-time business and government, critical data must be protected from loss or inaccessibility due to software or hardware failure. Today, many storage products do not provide complete failure protection and expose users to the risk of data loss or unavailability. For example, many storage solutions on the market today offer protection against some failure modes, such as processor failure, but not against others, such as disk drive failure. Many organizations are exposed to the risk of data loss or data unavailability due to component failure in their data storage system.

The data storage market is typically divided into two major segments, i.e., Direct Attached Storage (DAS) and Network Storage. DAS includes disks connected directly to a server.

Network Storage includes disks that are attached to a network rather than a specific server and can then be accessed and shared by other devices and applications on that network. Network Storage is typically divided into two segments, i.e., Storage Area Networks (SANs) and Network Attached Storage (NAS).

A SAN is a high-speed special-purpose network (or sub-network) that interconnects different kinds of data storage devices with associated data servers on behalf of a larger network of users. Typically, a SAN is part of the overall network of computing resources for an enterprise. A storage area network is usually clustered in close proximity to other computing resources but may also extend to remote locations for backup and archival storage, using wide area (WAN) network carrier technologies.

NAS is hard disk storage that is set up with its own network address rather than being attached to the local computer that is serving applications to a network's workstation users. By removing storage access and its management from the local server, both application programming and files can be served faster because they are not competing for the same processor resources. The NAS is attached to a local area network (typically, an Ethernet network) and assigned an IP address. File requests are mapped by the main server to the NAS file server.

All of the above share one common feature that can be an Achilles tendon in more ways than one, i.e., data is stored on a physical medium, such as a disk drive, CD drive, and so forth.

SUMMARY OF THE DESCRIPTION

The present invention provides methods and apparatus, including computer program products, for geolocation assisted data forwarding storage.

In general, in one aspect, the invention features, a method including, in a network of interconnected computer system nodes, receiving a request from a source system to store data, directing the data to a computer memory in conjunction with its geolocation, geolocation enabling selecting nodes that are proximate to each other or a user to increase speed and efficiency, and continuously forwarding the data from one computer memory to another computer memory in the network of interconnected computer system nodes in conjunction with their geolocations without storing on any physical storage device in the network, geolocation enabling selecting nodes that are proximate to each other or the user to increase speed and efficiency.

In another aspect, the invention features a network including a group of interconnected computer system nodes each receiving data and continuously forwarding the data from computer memory to computer memory in conjunction with IP address geolocations without storing on any physical storage device in response to a request to store data from a requesting system and retrieve data being continuously forwarded from computer memory to computer memory in response to a request to retrieve data from the requesting system, each node further configured to detect the presence of data in its memory, apply a time stamp, and forward the data to computer memory of another node in the interconnected computer systems nodes according to a node's availability and geolocation, geolocation enabling selecting nodes that are proximate to each other or a user to increase speed and efficiency.

The details of one or more implementations of the invention are set forth in the accompanying drawings and the description below. Further features, aspects, and advantages of the invention will become apparent from the description, the drawings, and the claims.

BRIEF DESCRIPTION OF THE DRAWINGS

The embodiments are illustrated by way of example and not limitation in the FIGs. of the accompanying drawings in which like references indicate similar elements.

DETAILED DESCRIPTION

Unlike peer to peer networks, which use data forwarding in a transient fashion so that data is eventually stored on a physical medium such as a disk drive, the present invention is a continuous data forwarding system, i.e., data is stored by continually forwarding it from one node memory to another node memory.

Figure 1:
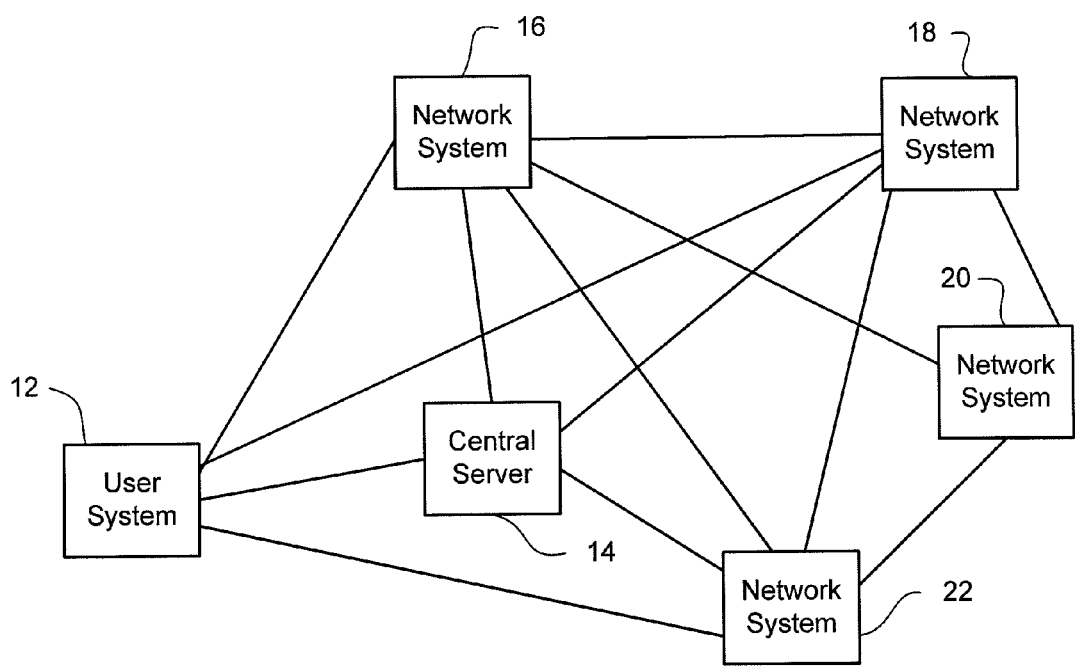
FIG. 1 is a block diagram of an exemplary network.

As shown in FIG. 1, an exemplary network 10 includes a user system 12 and a number of network systems 14, 16, 18, 20, 22. Each of the network systems 14, 16, 18, 20, 22 can be considered to be a node in the network 10 and one such network system may be designated as a central server, such as network system 14, which may assume a control position in network 10. Each of the nodes 14, 16, 18, 20, 22 may be established as a privately controlled network of peers under direct control of the central server 14. Peered nodes may also be a mix of private and public nodes, and thus not under the direct physical control of the central server 14. The network 10 may also be wholly public where the central server 14 (or servers) has no direct ownership or direct physical control of any of the peered nodes.

Figure 2:
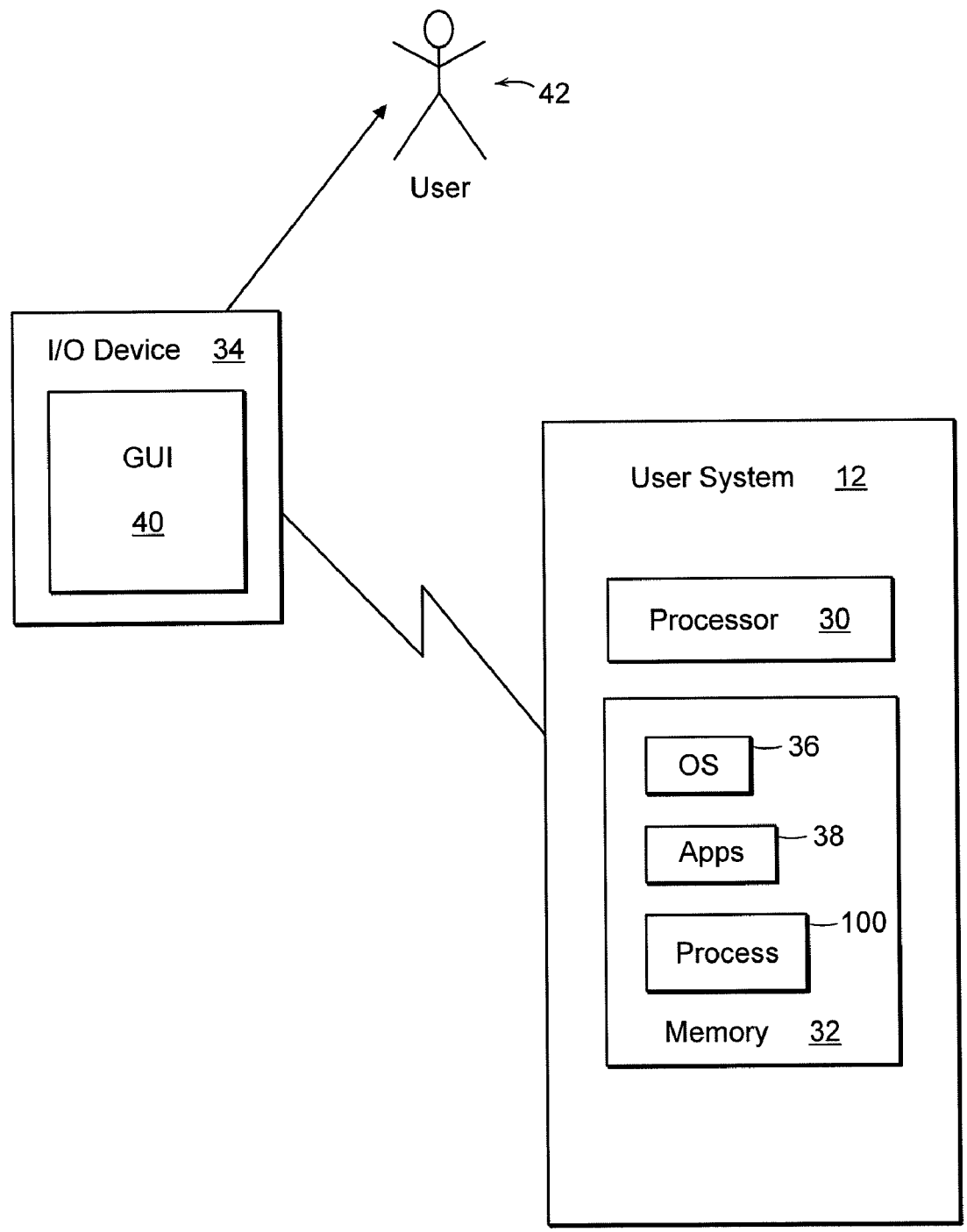
FIG. 2 is a block diagram of an exemplary user system.

As shown in FIG. 2, the user system 12 can include a processor 30, memory 32 and input/output (I/O) device 34. Memory 32 can include an operating system (OS) 36, such as Linux, Apple® OS or Windows®, one or more application processes 38, and a storage process 100, explained in detail below. Application processes 38 can include user productivity software, such as OpenOffice or Microsoft® Office. The I/O device 34 can include a graphical user interface (GUI) 40 for display to a user 42.

Figure 3:
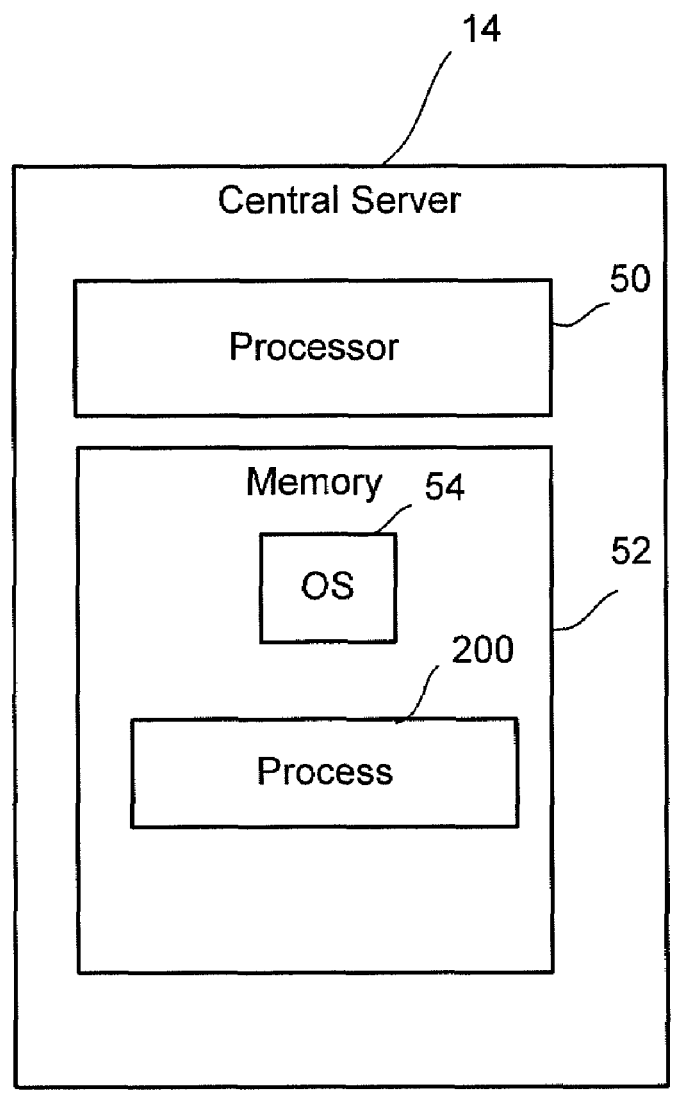
FIG. 3 is a block diagram of an exemplary network system.

As shown in FIG. 3, each of the network systems, such as network system 14, can include a processor 50 and memory 52. Memory 52 can include an OS 54, such as Linux, Apple® OS or Windows®, and a data forwarding process 200, explained in detail below.

In traditional systems, application processes 38 need to store and retrieve data. In these traditional systems, data is stored on local or remote physical devices. And in some systems, this data can be segmented into different pieces or packets and stored locally or remotely on physical mediums of storage. Use of fixed physical data storage devices add cost, maintenance, management and generate a fixed physical record of the data, whether or not that is the desire of the user 42.

The present invention does not use fixed physical data storage to store data. When a request to store data is received by the central server 14 from storage process 100, data is directed to a node in the network 10, assisted by a geolocation of the node, where it is then continuously forwarded from node memory to node memory in the network 10 by the data forwarding process 200 in each of the network nodes without storing on any physical storage medium such as a disk drive. The forwarded data resides only for a very brief period of time in the memory of any one node in the network 10. Data is not stored on any physical storage medium in any network node. Using geolocation enables speed and efficiency in forwarding data throughout the network, i.e., by selecting nodes that are proximate to each other and/or the user.

Geolocation generally refers to identifying a real-world geographic location of an Internet connected computer, mobile device, website visitor or other. Geolocation can be used to refer to the practice of assessing the location, or it can be used to refer to the actual assessed location or location data. Geolocation can be performed by associating a geographic location with, for example, the Internet Protocol address, Media Access Control (MAC) address, Radio Frequency Identification (RFID), hardware embedded article/production number, embedded software number (such as UUID, Exif/IPTC/XMP or modern steganography), Wi-Fi connection location, or device GPS coordinates, or other, perhaps self-disclosed, information.

Networks in general, and more particularly the Internet, have become a collection of resources meant to appeal to a large general audience. Although this multitude of information has been a great boon, it also has diluted the importance of geographically localized information. Offering the ability for network users to garner information based on geographic location can decrease search times and increase visibility of local establishments. Similarly, user communities and chatrooms can be enhanced through knowing the locations (and therefore, local times, weather conditions and news events) of their members as they roam the globe. It is possible to provide user services in applications and Web sites without the need for users to carry GPS receivers or even to know where they themselves are.

Geolocation by IP address is the technique of determining a user's geographic latitude, longitude and, by inference, city, region and nation by comparing the user's public Internet IP address with known locations of other electronically neighboring servers and routers.

Possible applications for geolocation by IP address exist for Weblogs, chat programs, user communities, forums, distributed computing environments, security, urban mapping and network robustness.

Although several methods of geographically locating an individual currently exist, each system has cost and other detriments that make them technology prohibitive in computing environments. Global Positioning System (GPS) is limited by line-of-sight to the constellation of satellites in Earth's orbit, which severely limits locating systems in cities, due to high buildings, and indoors, due to complete overhead blockage. Several projects have been started to install sensors or to use broadcast television signals to provide for urban and indoor geolocation.

By contrast, these environments already are witnessing a growing trend of installing wireless access points (AP). Airports, cafes, offices and city neighborhoods all have begun installing wireless APs to provide Internet access to wireless devices. Using this available and symbiotic infrastructure, geolocation by IP address can be implemented immediately.

Several RFC proposals have been made by the Internet Engineering Task Force (IETF) that aim to provide geolocation resources and infrastructure. Several companies now offer pay-per-use services for determining location by IP.

Several years ago, CAIDA, the Cooperative Association for Internet Data Analysis, began a geolocation by IP address effort called NetGeo. This system was a publicly accessible database of geographically located IP addresses. Through the use of many complex rules, the NetGeo database slowly filled and was corrected for the location of IP addresses.

To query the NetGeo database, an HTTP request is made with the query IP address, like this:

----

$ http://netgeo.caida.org/perl/netgeo.cgi?target=192.168.0.1

VERSION=1.0

TARGET: 192.168.0.1

NAME: IANA-CBLK1

NUMBER: 192.168.0.0-192.168.255.255

CITY: MARINA DEL REY

STATE: CALIFORNIA

COUNTRY: US

LAT: 33.98

LONG: −118.45

LAT_LONG_GRAN: City

LAST_UPDATED: 16 May 2001

NIC: ARIN

LOOKUP_TYPE: Block Allocation

RATING:

DOMAIN_GUESS: iana.org

STATUS: OK

----

The NetGeo response includes the city, state, country, latitude and longitude of the IP address in question. Furthermore, the granularity (LAT_LONG_GRAN) also is estimated to give some idea about the accuracy of the location. This accuracy also can be deduced from the LAST_UPDATED field. Obviously, the older the update, the more likely it is that the location has changed. This is true especially for IP addresses assigned to residential customers, as companies holding these addresses are in constant flux.

Several existing packages assist in retrieving information from the NetGeo database. The PEAR system has a PHP package, and a PERL module, CAIDA::NetGeo::Client, is available. It is a relatively straightforward task to make a request in whatever language you are using for your application or service. For example, a function in PHP for getting and parsing the NetGeo response looks like this:

----

1: function getLocationCaidaNetGeo($ip)

2: {

3: $NetGeoURL="http://netgeo.caida.org/perl/netgeo.cgi?target=".$ip;

4: 5: if($NetGeoFP=fopen($NetGeoURL,r))

6: {

7: ob_start( );

8:

9: fpassthru($NetGeoFP);

10: $NetGeoHTML=ob_get_contents( );

11: ob_end_clean( );

12:

13: fclose($NetGeoFP);

14: }

15: preg_match ("/LAT:(.*)/i", $NetGeoHTML, $temp) or die("Could not find element LAT");

16: $location[0]=$temp[1];

17: preg_match ("/LONG:(.*)/i", $NetGeoHTML, $temp) or die("Could not find element LONG");

18: $location[1]=$temp[1];

19:

20: return $location;

21: }

----

The NetGeo database slowly is becoming more inaccurate as IP address blocks change hands in company close-outs and absorptions. Several other tools are available for determining location, however. A description of the NetGeo infrastructure itself presents some of the methods it employed for mapping IP addresses and can be a source of guidance for future projects.

One of the most useful geolocation resources is DNS LOC information, but it is difficult to enforce across the Internet infrastructure. RFC 1876 is the standard that outlines "A Means for Expressing Location Information in the Domain Name System." Specifically, this is done by placing the location information of a server on the DNS registration page. Several popular servers have employed this standard but not enough to be directly useful as of yet.

To check the LOC DNS information of a server, you need to get the LOC type of the host:

----

$ host –t LOC yahoo.com yahoo.com LOC 37 23 30.900 N 121 59 19.000 W 7.00 m 100 m 100 m 2 m

----

This parses out to 37 degrees 23' 30.900" North Latitude by 121 degrees 59' 19.000" West Longitude at 7 meters in altitude, with an approximate size of 100 meters at 100 meters horizontal precision and 2 meters vertical precision. There are several benefits to servers that offer their geographic location in this way. First, if you are connecting from a server that shows its DNS LOC information, determining your geolocation is simple, and applications may use this information without further work, although some verification may be useful. Second, if you are connecting on your second or third bounce through a server that has DNS LOC information, it may be possible to make an estimate of your location based on traffic and ping times. However, these estimates greatly degrade accuracy.

It also is possible to put the DNS LOC information for your Web site in its registration. If more servers come to use LOC information, geolocation accuracy will be much easier to attain.

"host" is a DNS lookup utility that allows users to find out various pieces of information about a host. The simplest use is doing hostname to IP address lookups and the reverse. The reverse, dotted-decimal IPv4 notation, is used for this, and the actual server that hosts the canonical name is returned. The type flag, –t, can be used to obtain specific information from the host record from the name server.

Service providers typically provide an internal naming scheme for assigning IP addresses and associating names with these addresses. Typically, the canonical name of an IP address contains the country-code top-level domain (ccTLDs) in a suffix. CN is China, FR is France, RO is Romania and so on. Furthermore, the name even may contain the city or region in which the IP address is located. Often, however, this information is shortened to some name that requires a heuristic to determine. For example, in your service or application, a user may appear to be coming from d14-69-1-64.try.wideopenwest.com. A whois at this address reveals it is a WideOpenWest account from Michigan. Using some logic, it is possible to deduce that this user is connecting through a server located in Troy, Mich., hence the .try. in the canonical name.

Some projects have been started to decipher these addresses, and you also can get all of the country codes and associated cities and regions of a country from the IANA Root-Zone Whois Information or the US Geospatial Intelligence Agency, which hosts the GEOnet Names Server (GNS). The GNS has freely available data files on almost all world countries, regions, states and cities, including their sizes, geographic locations and abbreviations, as well as other information.

Information such as that presented on the GNS also can be used to provide users with utilities and services specific to their geographical locations. For example, it is possible to determine a user's local currency, time zone and language. Time zone is especially useful for members of a community or chat group to determine when another friend may be available and on-line.

When a request to retrieve data is received by the central server 14 from storage process 100, the requested data, which is being forwarded from node memory to node memory in the network 10 assisted by geolocations of the nodes, is retrieved.

Data forwarded in this manner can be segmented and segments forwarded as described above. Still, the segmented data is not stored on any physical storage medium in any network node, but merely forwarded from the memory of one node to the memory of another node.

Figure 4:
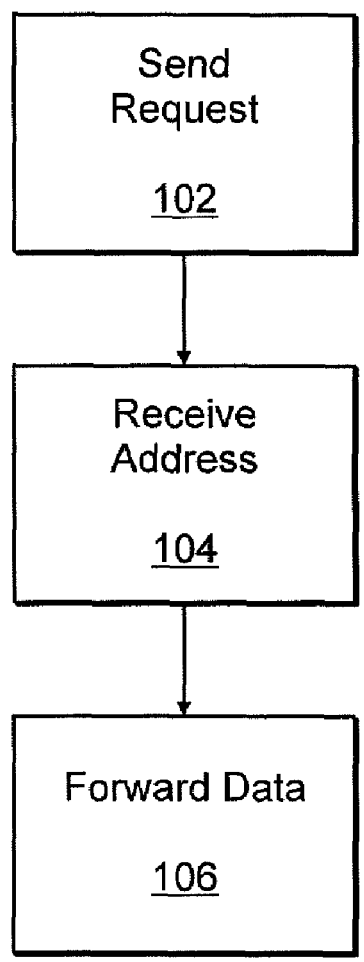
FIG. 4 is a flow diagram of a process.

As shown in FIG. 4, storage process 100 includes sending (102) a request to a central server 14 to store or retrieve data. If the request is a retrieve data request, storage process 100 receives the requested data from the central server 14 or node in the network.

If the request to the central server 14 is a store data request, storage process 100 receives (104) an address of a node from the central server 14 and forwards (106) the data to the node memory represented by the received address. The central server 14 is assisted in finding an appropriate address by a geolocation, which can help locate a node that is underutilized or light in terms of network traffic.

Figure 5:
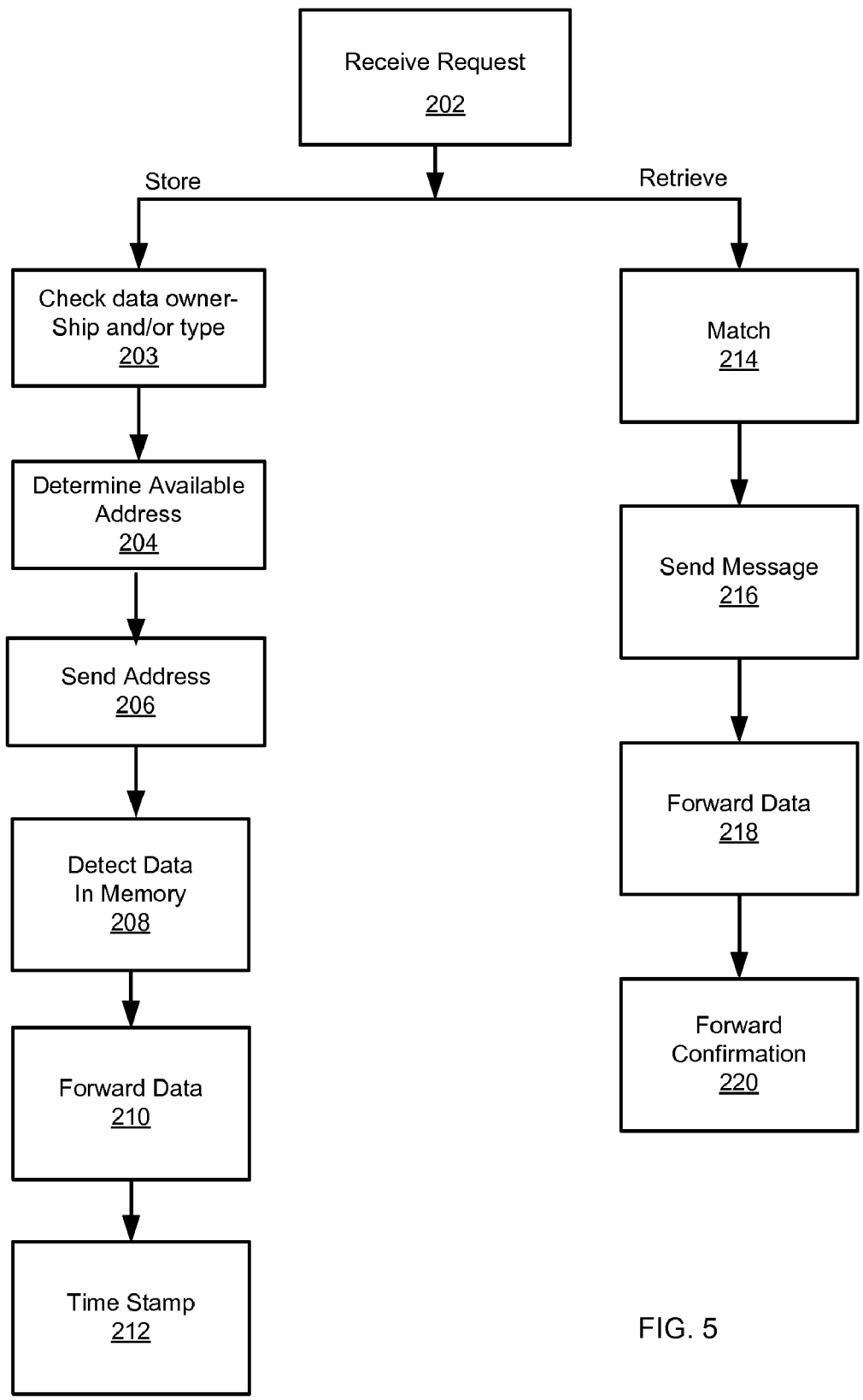
FIG. 5 is a flow diagram of a process.

As shown in FIG. 5, data forwarding process 200 includes receiving (202) a request to store or retrieve data. If the received request is a request to store data, data forwarding process 200 determines (204) an address of a node available to receive the data in memory assisted by its geolocation. This determination (204) can include using a geolocation to help locate a node, pinging the network and determining which of the nodes in a network is available, or determining which node in the network has the least traffic, or determining which node in the network has the largest available memory, or the geographic coordinates of the node, or any combination of these or other factors. Using geolocation enables greater speed and efficiency by selecting nodes that are proximate to each other and/or the user.

Process 200 sends (206) a message to the user system with the address of a specific node for the requester to forward the data.

Process 200 detects (208) the presence of data in node memory. Process 200 forwards (210) the data in memory to another node in the network of nodes, assisted by geolocation (e.g., a location of the node in the network) and continues to repeat detecting (208) and forwarding (210) of the data from node memory to node memory assisted by geolocation. When data arrives in any node memory, process 200 affixes (212) a time stamp to the data.

Forwarding (210) can include pinging the node in the network to determine which of the nodes in the network is available, or determining which node in the network has the least traffic, or determining which node in the network has the largest available memory, or any combination of these or other factors.

In one specific example, at the point of entry to a node, data undergoes an encrypted "handshake" with the node or central server 14 or user. This can be a public or private encryption system, such as the Cashmere system, which can use public-private keys. Cashmere decouples the encrypted forwarding path and message payload, which improves the performance as the source only needs to perform a single public key encryption on each message that uses the destination's unique public key. This has the benefit that only the true destination node will be able to decrypt the message payload and not every node in the corresponding relay group. Cashmere provides the capability that the destination can send anonymous reply messages without knowing the source's identity. This is done in a similar way, where the source creates a reply path and encrypts it in a similar manner as the forwarding path.

In another example, other routing schemes are utilized.

If the received request is a request to retrieve data being continuously forwarded from node memory to node memory, data forwarding process 200 matches (214) at the central server 14 using a hash mark or other unique code that can be "sniffed" by the node upon the data entering the node via the encryption handshake. This can occur by pinging the nodes in the network. Process 200 sends (216) the message to return the data to the user directly to the node or node state where the central server 14 believes the data will likely appear. The more the central server 14 can narrow the node state that it pings to, then the more efficient the retrieval will become and the less burdened by unnecessary messaging traffic to nodes that are not necessary for a transaction between the central server 14 and the node capable of forwarding the data.

Once the correct node receives the message to forward the data in node memory to the requester, process 200 forwards (218) in node memory the data to the requester and forwards (220) a confirmation message that the data has been sent to the user. This routing message may be sent directly to the central server 14 or may be passed to the central server 14 or servers via other node(s) or supernode(s) in the network 10. Upon the user receiving the requested data the user's application functions to automatically ping the central server 14 that the data requested has been received. Thus the network 10 creates data storage without caching, downloading and/or storing the data on any physical storage medium. Data storage and management is accomplished via a continuous routing of the data from node memory to node memory, the forwarded data only downloaded when the user requests the data to be returned to the user from the network 10.

New nodes and node states may be added and/or deleted from the network 10 based upon performance. Users may have access to all nodes or may be segmented to certain nodes or "node states" by the central server(s) or via the specific architecture of the private, public or private-public network.

Individual nodes, nodes states and supernodes may also be extranet peers, wireless network peers, satellite peered nodes, Wi-Fi peered nodes, broadband networks, and so forth, in public or private networks. Peered nodes or users may be used as routing participants in the network 10 from any valid peer point with the same security systems employed, as well as custom solutions suitable for the rigors of specific deployments, such as wireless encryption schemes for wireless peers, and so forth.

In process 200, rather than have data cached or held in remote servers, hard drives or other fixed storage medium, the data are passed, routed, forwarded from node memory to node memory. The data are never downloaded until the authorized user calls for the data. A user on the system may authorize more than one user to have access to the data.

A primary goal in process 200 is to generate a data storage and management system where the data is never fixed in physical storage, but in fact, is continually being routed/forwarded from node memory to node memory in the network. The path of the nodes to which data is forwarded may also be altered by the central server 14 to adjust for system capacities and to eliminate redundant paths of data that may weaken the security of the network due to the increased probability of data path without this feature.

The invention can be implemented to realize one or more of the following advantages. A network creates data storage without caching or downloads. Data storage and management are accomplished via a constant routing of the data.

Embodiments of the invention can be implemented in digital electronic circuitry, or in computer hardware, firmware, software, or in combinations of them. Embodiments of the invention can be implemented as a computer program product, i.e., a computer program tangibly embodied in a computer readable medium, e.g., in a machine readable storage device, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

Method steps of embodiments of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in special purpose logic circuitry.

It is to be understood that the foregoing description is intended to illustrate and not to limit the scope of the invention, which is defined by the scope of the appended claims. Other embodiments are within the scope of the following claims.

What is claimed is:

1. A method comprising:
in a network of interconnected computer system nodes, receiving a request from a source system to store at least one data item;
directing the at least one data item to a node in conjunction with its geolocation, geolocation enabling selecting nodes that are proximate to each other or a user to increase speed and efficiency;
in response to the request from the source system, continuously forwarding the at least one data item among the nodes in the network of interconnected computer system nodes in conjunction with their geolocations without storing the forwarded at least one data item on any fixed storage medium in the network, the forwarded at least one data item being constantly routed within the network from node to node, the forwarded at least one data item being available for retrieval if a request to retrieve the at least one data item is received, geolocation enabling selecting nodes that are proximate to each other or to the user to increase speed and efficiency, the continuously forwarding comprising:
determining an address of a node available to receive the at least one data item based on geolocation and on one or more factors;
sending a message to the source system with the address of a specific node;
detecting a presence of the at least one data item at the specific node; and
forwarding the at least one data item to another node in the network of interconnected computer system nodes in conjunction with their geolocations without storing the forwarded at least one data item on any fixed storage medium.

2. The method of claim 1 wherein continuously forwarding further comprises applying a time stamp to the at least one data item at the specific node.

3. The method of claim 2 wherein the one or more factors comprise network traffic analysis and available memory.

4. The method of claim 1 further comprising:
receiving a request from the source system to retrieve the at least one data item being continuously forwarded among the nodes in the network of interconnected computer system nodes; and
retrieving the at least one data item from a node in response to the request to retrieve the at least one data item.

5. The method of claim 4 wherein retrieving comprises:
matching the at least one data item request at a central server using a hash mark representing the at least one data item entering a node;
sending a message to a node that is predicted to have the at least one data item, the message instructing the node to forward the at least one data item to the source system; and
sending a confirmation message to the central server that the at least one data item has been forwarded to the source system.

6. The method of claim 5 further comprising receiving an acknowledgment from the source system that the requested at least one data item has been received.

7. A tangible computer readable medium embodying instructions for causing a data processing apparatus to perform a method for storing data items in a network of interconnected computer system nodes, the method comprising:
receiving a request from a source system to store at least one data item;
directing the at least one data item to a node in conjunction with its geolocation, geolocation enabling selecting nodes that are proximate to each other or a user to increase speed and efficiency;
in response to the request from the source system, storing the data by continuously forwarding the at least one data item from one node to another node among the nodes in the network of interconnected computer system nodes in conjunction with their geolocations without storing the forwarded at least one data item on any fixed storage medium in the network, the forwarded at least one data item being constantly routed within the network from node to node, the forwarded at least one data item being available for retrieval if a request to retrieve the at least one data item is received, geolocation enabling selecting nodes that are proximate to each other or the user to increase speed and efficiency, the continuously forwarding comprising:

determining an address of a node available to receive the at least one data item based on geolocation and on one or more factors;

sending a message to the source system with the address of a specific node;

detecting a presence of the at least one data item at the specific node; and forwarding the at least one data item to another node in the network of interconnected computer system nodes without storing the forwarded at least one data item on any fixed storage medium.

8. The computer readable medium of claim 7 wherein continuously forwarding further comprises applying a time stamp to the at least one data item at the specific node.

9. The computer readable medium of claim 7 wherein the one or more factors comprise network traffic analysis and available memory.

10. The computer readable medium of claim 7 wherein the method further comprises:

receiving a request from the source system to retrieve the at least one data item being continuously forwarded in the network of interconnected computer system nodes; and retrieving the at least one data item from a node in response to the request to retrieve the at least one data item.

11. The computer readable medium of claim 10 wherein retrieving comprises:

matching the at least one data item retrieval request at a central server using a hash mark representing the at least one data item entering a node;

sending a message to a node that is predicted to have the at least one data item, the message instructing the node to forward the at least one data item to the source system; and sending a confirmation message to the central server that the at least one data item has been forwarded to the source system.

12. The computer readable medium of claim 11 wherein the method further comprises receiving an acknowledgment from the source system that the requested at least one data item has been received.

13. A network comprising:

a group of interconnected computer system nodes, each node configured to:

in response to a request from a source system to store at least one data item, receive the at least one data item and continuously forward the at least one data item among the computer system nodes in conjunction with IP address geolocations without storing the forwarded at least one data item on any fixed storage medium, the forwarded at least one data item being constantly routed from node to node within the group of interconnected computer system nodes;

in response to a request from the source system to retrieve the at least one data item, retrieve the at least one data item being continuously forwarded among the computer system nodes; and each node further configured to detect the presence of the at least one data item, apply a time stamp, and forward the at least one data item to another node in the group of interconnected computer systems nodes according to a node's availability and geolocation, geolocation enabling selecting nodes that are proximate to each other or a user to increase speed and efficiency.

14. The network of claim 13 wherein the node's availability is determined according to its volume of network traffic.

15. The network of claim 14 wherein each node encrypts the at least one data item.

16. The network of claim 13 wherein the group of nodes comprises a central server that matches the at least one data item retrieval request using a hash mark representing the at least one data item entering a node, sends a message to a node that is predicted to have the at least one data item, the message instructing the node to forward the at least one data item to the source system, and receives a confirmation message that the at least one data item has been forwarded to the source system.

* * * * *